(12) United States Patent
Mullen et al.

(10) Patent No.: US 9,983,646 B2
(45) Date of Patent: May 29, 2018

(54) SMART CIRCUIT BREAKER FOR DEVICE CHARGERS

(71) Applicant: Verizon Patent and Licensing Inc., Arlington, VA (US)

(72) Inventors: Christopher M. Mullen, Branchburg, NJ (US); Russell Carpenter, Branchburg, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 4 days.

(21) Appl. No.: 14/832,830

(22) Filed: Aug. 21, 2015

(65) Prior Publication Data

US 2017/0052580 A1 Feb. 23, 2017

(51) Int. Cl.
*G06F 1/26* (2006.01)
*H02J 7/00* (2006.01)

(52) U.S. Cl.
CPC .............. *G06F 1/266* (2013.01); *G06F 1/263* (2013.01); *H02J 7/0073* (2013.01)

(58) Field of Classification Search
None
See application file for complete search history.

(56) References Cited

U.S. PATENT DOCUMENTS

| | | | | |
|---|---|---|---|---|
| 2004/0097265 A1* | 5/2004 | Cadieux | ............... | G06F 1/3203 455/557 |
| 2010/0152912 A1* | 6/2010 | Huang | ................... | G06F 1/266 700/295 |
| 2011/0254383 A1* | 10/2011 | Franz | ....................... | H02J 7/02 307/131 |
| 2012/0233478 A1* | 9/2012 | Mucignat | ............ | H04L 12/2825 713/320 |
| 2013/0007485 A1* | 1/2013 | Kim | ......................... | G06F 1/26 713/320 |
| 2015/0100173 A1* | 4/2015 | Tubi | ........................ | G08C 17/02 700/297 |
| 2015/0281427 A1* | 10/2015 | Onstad | ............. | H04M 1/72533 455/420 |
| 2016/0072326 A1* | 3/2016 | Nilles | ................... | H02J 7/0044 320/114 |

* cited by examiner

*Primary Examiner* — Paul Yanchus, III

(57) ABSTRACT

A circuit breaker device may wirelessly communicate with a user device, in order to supply power to the user device, via a charger, at times when charging the user device may be desirable. The circuit breaker device may also forgo supplying power to the user device, via the charger, at times when charging the user device may not be necessary. The user device may request charging at certain times, such as when a charge level of the battery is excessively low, and/or when an alarm clock, set by a user of the user device, is about to ring.

20 Claims, 12 Drawing Sheets

SMART CIRCUIT BREAKER FOR DEVICE CHARGERS

BACKGROUND

As portable devices, such as smart phones, tablets, laptop computers, etc., become more ubiquitous, the need for power to charge these devices increases. Typical chargers draw current when plugged in to an alternating current ("AC") power outlet, even when a device is not charging.

DETAILED DESCRIPTION OF PREFERRED EMBODIMENTS

The following detailed description refers to the accompanying drawings. The same reference numbers in different drawings may identify the same or similar elements.

Systems and/or methods, described herein, may allow for the reduced power consumption by chargers of users devices, such as mobile telephones, tablet computers, or the like. Specifically, in some implementations, a "smart" circuit breaker may break a circuit between a charging device (also referred to as a "charger") and a power source (e.g., an alternating current ("AC") wall outlet) when a user device is not plugged in, and/or when the user device does not necessarily need to be charging. Furthermore, in accordance with some implementations, a smart charger may ensure that a user device is fully charged when a full charge is needed (e.g., shortly after an alarm function is set on the user device, which may be related to when a user of the user device wakes up and removes the user device from the charger).

Figure 1:
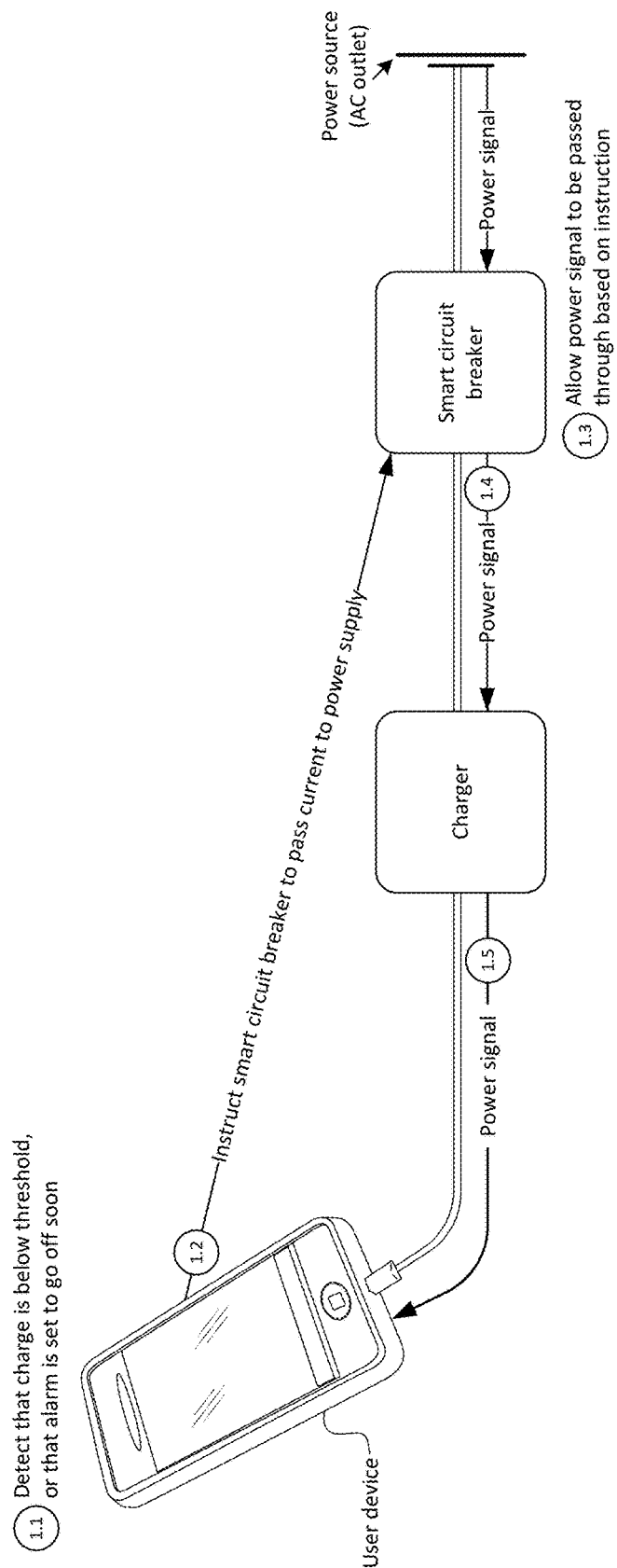
FIGS. 1 and 2A-2D illustrate example overviews of one or more implementations described herein.

For example, as shown in FIG. 1, a user device may be connected (e.g., via a cable that transfers a power signal) to a charger. The charger may be, for example, a conventional charger (e.g., an off-the-shelf phone charger, which may include couplings for the cable and for an AC wall outlet, as well as a transformer, a rectifier, one or more filters, and/or other circuitry suitable for supplying usable power to the user device). The charger may be coupled to a smart circuit breaker, which may intelligently control the supplying of power from an AC power source to the charger (and, in turn, to the user device).

In some implementations, the smart circuit breaker may receive power from a low-voltage battery, and/or some other power source, that consumes less power than the charger would consume if left plugged in to the AC outlet. The smart circuit breaker may include wireless circuitry and/or logic that may communicate with the smart user device (e.g., using Bluetooth Low Energy ("BLE"), Near Field Communications ("NFC"), and/or some other type of short-range wireless communication), and may determine when current should be allowed to pass from the AC outlet to the charger.

Referring to the example shown in FIG. 1, assume that the smart circuit breaker is "off"—that is, that the smart circuit breaker is blocking the power signal from being passed from the AC outlet to the charger. The user device may, at some point, determine (at 1.1) that the charge level of the user device is below a threshold charge level (e.g., below 50% charged), and/or that an alarm, set on the user device, is set to go off soon (e.g., within 20 minutes). Based on this determination, the user device may output (at 1.2) an instruction (e.g., via BLE) to the smart circuit breaker, to allow the power signal to be passed from the AC outlet to the charger.

Based on receiving the instruction, the smart circuit breaker may allow (at 1.3) the power signal to be passed to the charger (at 1.4). The charger may transform, rectify, filter, and/or perform some other conventional technique, in order to convert the power signal into a usable power signal for the user device, and may provide (at 1.5) the converted power signal to the user device, thereby allowing the user device to be charged.

Referring to FIGS. 2A-2D, a smart circuit breaker, according to some implementations, may be activated by the actuation of a physical button ("charge initiation button") on the smart circuit breaker. The charge initiation button may be used in implementations where the smart circuit breaker is not equipped with a battery (or alternative power source). In some implementations, the smart circuit breaker, shown in the example of FIGS. 2A-2D, may not communicate with the user device, and may not be equipped with wireless circuitry. The smart circuit breaker may initially receive power, from the AC outlet, by the actuation of the charge initiation button (e.g., a user may depress the charge initiation button after coupling the user device to the cable). For example, the charge initiation button may be coupled to an electromagnet, or some other type of device, that allows power to be supplied to other components of the smart circuit breaker once power is received by the electromagnet.

Figure 2A:
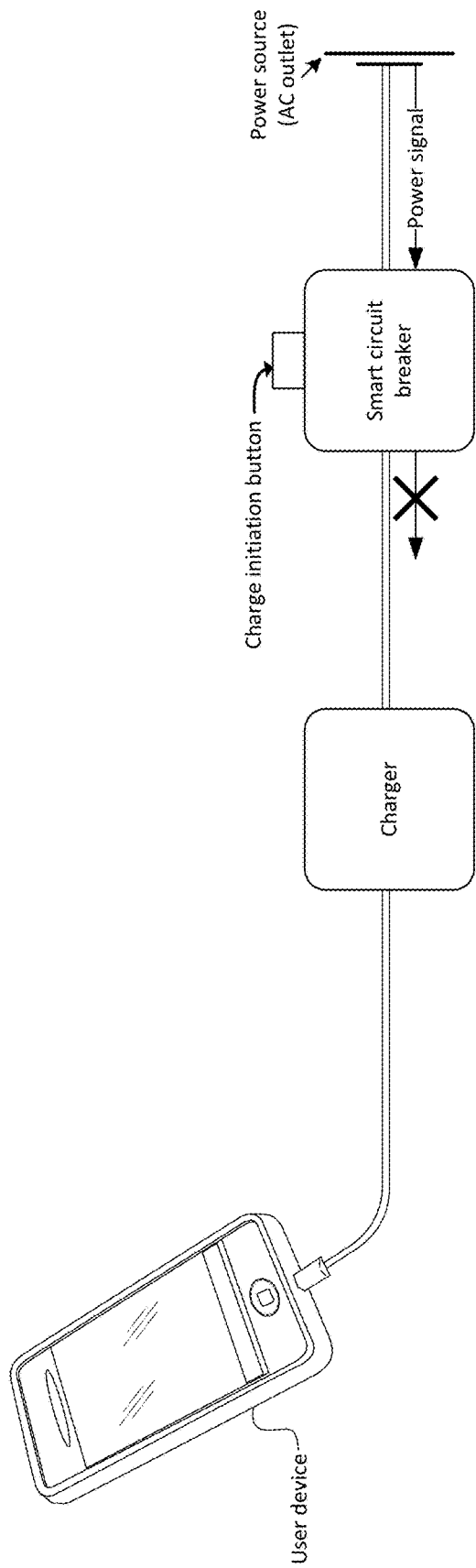
Figure 2B:
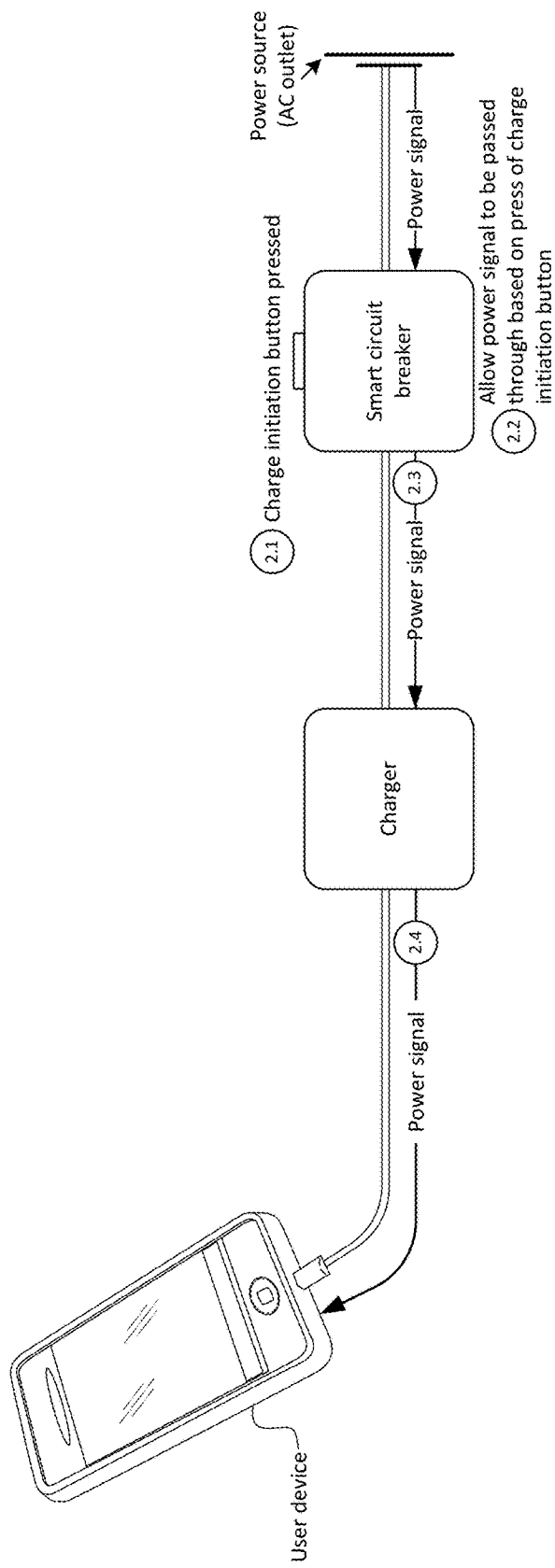

In the example shown in FIG. 2A, the charge initiation button may not have been pressed, and therefore, the power signal from the AC outlet may not be supplied to the charger. In the example shown in FIG. 2B, the charge initiation button may be depressed (at 2.1). Based on the pressing of the charge initiation button, the smart circuit breaker may allow (at 2.2) the power signal to be passed to the charger (at 2.3), which may provide (at 2.4) a usable power signal to the user device. The smart circuit breaker may also utilize a portion of the power signal, in order to power logic and/or circuitry within the smart circuit breaker (e.g., logic and/or circuitry that allows the power signal to be passed, and which may subsequently disable the passing of the power signal).

Figure 2C:
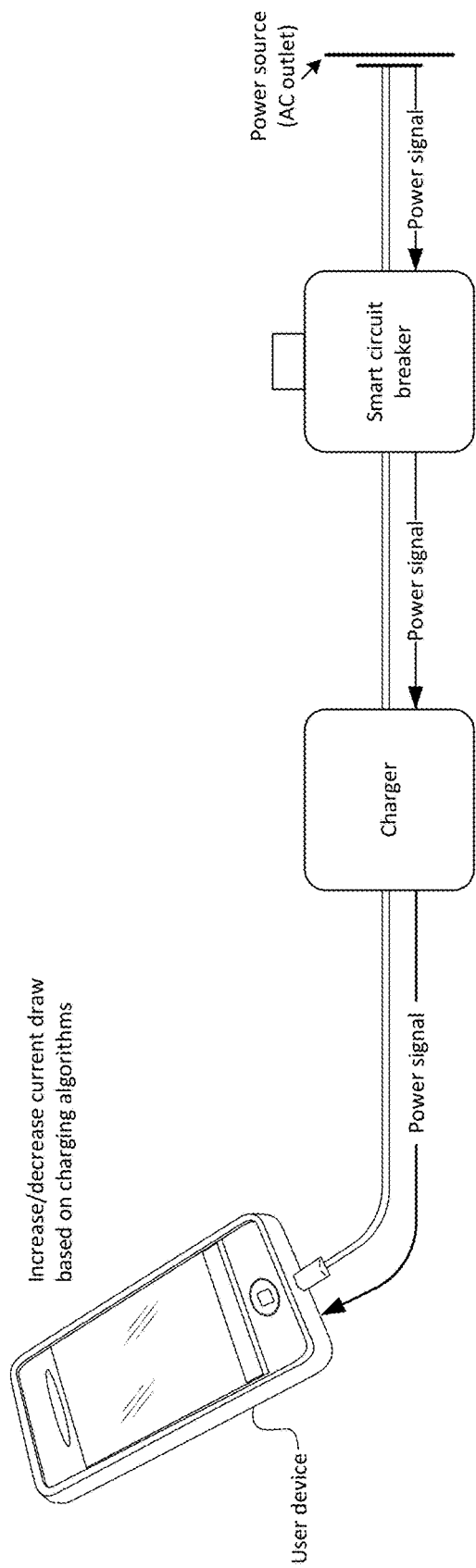
Figure 2D:
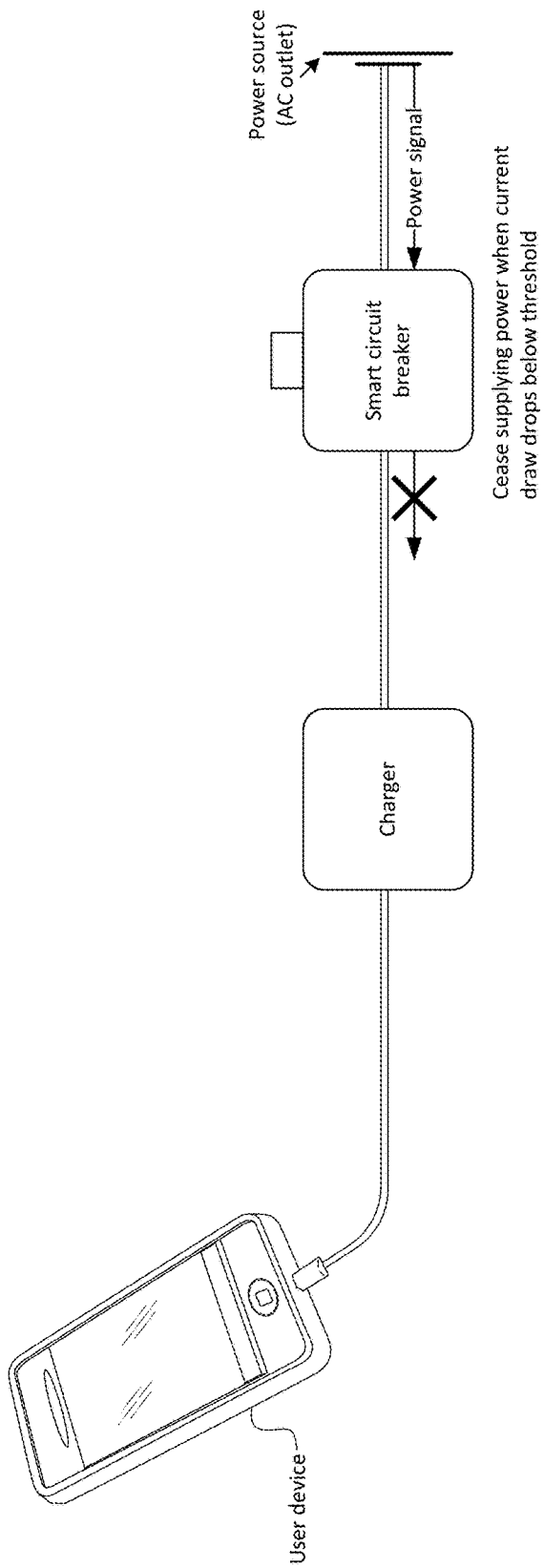

In accordance with some implementations, and as illustrated in FIG. 2C, the user device may increase and/or decrease the amount of current drawn, based on certain conditions. For example, the user device may decrease the amount of current drawn while the user device is charging at night, and/or may increase the amount of current drawn if an alarm is set to go off soon and the charge level of the user device is not full. At some point, the current draw, by the user device may drop below a threshold level (e.g., may drop to zero when the user device is unplugged, and/or may drop based on the user device reducing the amount of current drawn for some other reason). As shown in FIG. 2D, once the current draw drops below the threshold, logic and/or circuitry within the smart circuit breaker may cause the smart circuit breaker to cease supplying the power signal to the charger. At a later time, the charging process may be started again by an actuation of the charge initiation button.

Figure 3:
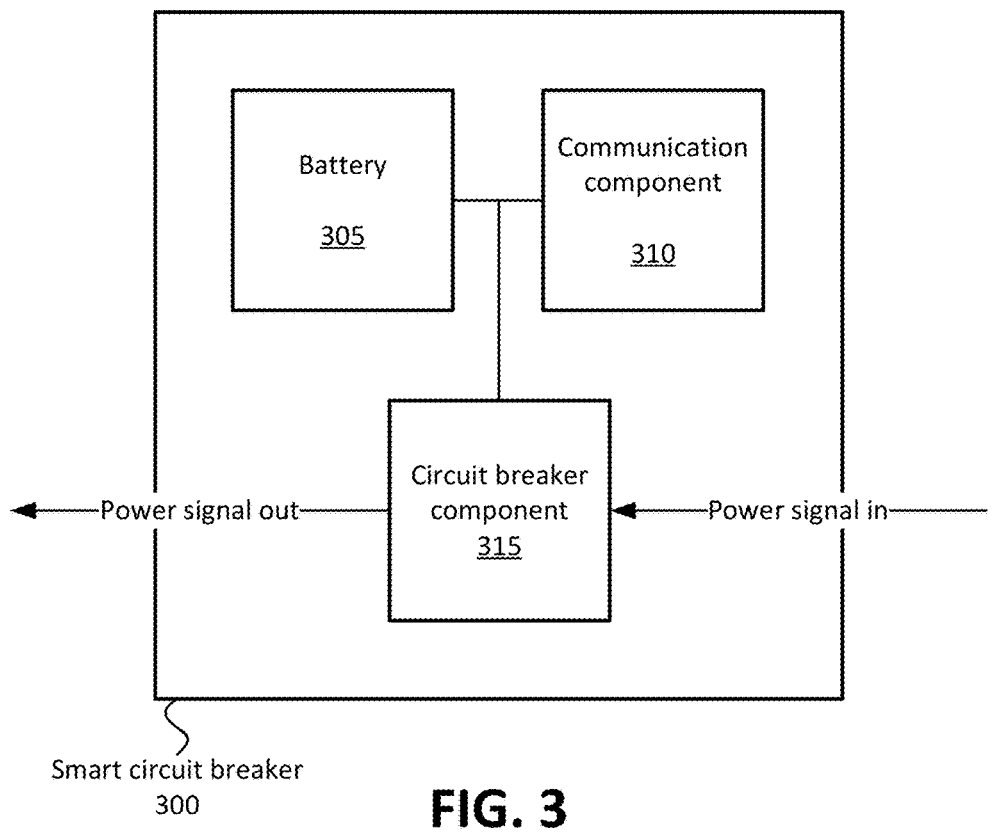
FIG. 3 illustrates example functional components of a smart circuit breaker, in accordance with some implementations described herein.

FIG. 3 illustrates example functional components of smart circuit breaker 300, in accordance with some implementations. As shown, smart circuit breaker 300 may include battery 305, communication component 310, and circuit breaker component 315. In some implementations, smart circuit breaker 300 may include additional, fewer, different, or differently arranged components. One or more of components 305-315 may be implemented completely, or in part, by hardware circuitry, software logic, and/or a combination thereof.

Battery 305 may be a battery, and/or some other power source (e.g., a direct current ("DC")) power source, that supplies power to other components of smart circuit breaker 300 (e.g., communication component 310 and/or circuit breaker component 315). Battery 305 may, for example, be a watch battery, a 9-volt battery, a 1.5-volt battery, and/or some other type of battery.

Communication component 310 may include hardware circuitry and/or software logic, via which smart circuit breaker 300 may wirelessly communicate with a user device. For example, communication component 310 may be a BLE component, an NFC component, a Wi-Fi component (e.g., based on an Institute of Electrical and Electronics Engineers ("IEEE") 802.11-based standard), and/or some other wireless communication component. In some implementations, communication component may receive power from battery 305 (e.g., may not be powered by an AC power source).

Circuit breaker component 315 may include hardware circuitry and/or software logic, that may receive a power signal from a power source (e.g., an AC power source, such as an AC outlet), and may allow the power signal to pass through to an external device (e.g., a phone charger) or may block the power signal from being passed through. In some implementations, circuit breaker component 315 may not consume any AC power when blocking the power signal from being passed through.

Circuit breaker component 315 may, for example, include a physical connector (e.g., a two-prong plug, a three-prong plug, etc.), via which smart circuit breaker 300 may be coupled to an AC outlet. In some implementations, circuit breaker component 315 may include a physical connector (e.g., an AC receptacle), via which smart circuit breaker 300 may be coupled to an external device (e.g., a charger).

Circuit breaker component 315 may make determinations, as to whether to allow the power signal to be passed, based on signals received from a user device (e.g., via communication component 310). For example, as described in greater detail below, circuit breaker component 315 may receive a request, from a user device, to allow or disallow the passage of the power signal.

Figure 4:
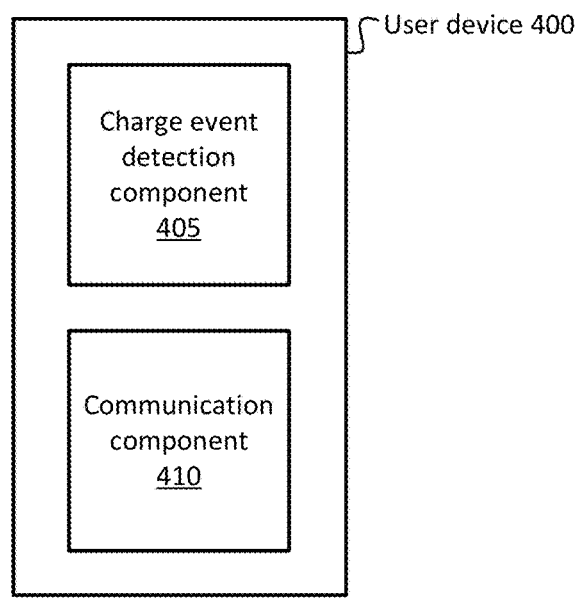
FIG. 4 illustrates example functional components of a user device, in accordance with some implementations described herein.

FIG. 4 illustrates example components of user device 400, in accordance with some implementations. As shown, user device 400 may include charge event detection component 405 and communication component 410. In some implementations, user device 400 may include additional, fewer, different, or differently arranged components. One or both of components 405 and/or 410 may be implemented completely, or in part, by hardware circuitry, software logic, and/or a combination thereof.

Charge event detection component 405 may determine when user device 400 should request a charge (e.g., from smart circuit breaker 300), and when user device 400 should request that charging should be ceased. Charge event detection component 405 may communicate with other components of user device 400, in order to make this determination. For example, charge event detection component 405 may communicate with an alarm component (sometimes referred to as an "alarm clock"), which may be set by a user of user device 400. As another example, charge event detection component 405 may also communicate with a battery charge component of user device 400, which may monitor and report a charge level of a battery associated with user device 400. Charge event detection component 405 may, in some implementations, communicate with a timekeeping component (e.g., a "clock"), which may provide information to charge event detection component 405 regarding the current time.

Charge event detection component 405 may, for example, determine that user device 400 should request a charge when the battery level, of user device 400, is below a threshold charge level (e.g., below 50% charged). As another example, charge event detection component 405 may determine that user device 400 should request a charge when an alarm is set to go off relatively soon (e.g., within 20 minutes of the current time). As yet another example, charge event detection component 405 may determine that user device 400 should request that charging be ceased when the battery level is above a threshold charge level (e.g., above 90% charged), and that an alarm is not set to go off soon (e.g., in the middle of the night).

As another example, charge event detection component 405 may monitor, and/or receive from an external source, information regarding a behavior of the user, and may make determinations, relating to requesting a charge, based on the behavior. For instance, charge event detection component 405 may communicate with a motion-sensing component (e.g., one or more accelerometers) of user device 400, and identify times that user device 400 is typically idle for several hours during a particular time frame (e.g., between the hours of 11:00 PM and 7:00 AM), and that user device 400 is subsequently typically in motion after the time frame (e.g., user device 400 experiences motion beginning at 7:00 AM). From this type of behavior, it may be inferred that the user is typically asleep between 11:00 PM and 7:00 AM, and wakes up at 7:00 AM. Thus, even in the absence of an alarm, charge event detection component 405 may be able to determine that user device 400 should be fully charged by 7:00 AM, and does not necessarily need to be fully charged before 7:00 AM.

As mentioned above, charge event detection component 405 may receive user behavior information from an external source. For example, charge event detection component 405 may receive user behavior information from one or more servers that collect and/or aggregate user behavior information, and my use the user behavior information when making determinations as to whether charging should be requested or not. For example, the user may have consented to a data collection service, whereby a server monitors the user's activity (e.g., geographical location activity, web browsing activity, messaging activity, etc.), and such data may be used to infer user behavior.

In some implementations, charge event detection component 405 may receive location information from a location determination component associated with user device 400 (e.g., a global positioning system ("GPS") component), and/or from an external source (e.g., from a cellular network, which may determine the location of user device 400 using cell triangulation and/or another technique). A charge event may be detected based on the location of user device 400, such as when user device 400 is located in, or near, a home address of a user associated with user device 400. For instance, charge event detection component 405 may compare the present location of user device 400 with account information (which may be received from a wireless telecommunications network provider associated with user device 400, directly from the user, and/or from another source), which indicates the geographical location and/or home address of the user.

As another example, charge event detection component 405 may compare the present location of user device 400 to a list of known locations of hotels, motels, inns, and/or other establishments in which individuals may typically sleep. For instance, charge event detection component 405 may receive and/or store information regarding the locations of such establishments, and a charge event may be detected when user device 400 is located within, or near, such an establishment.

In some implementations, the charge event may be based on time, location, motion sensor information, and/or past behavior information. For instance, assume that user device 400 is located in a hotel at 10:00 PM. Further assume that user device 400 has been motionless for fifteen minutes. Further assume that past behavior information indicates that user device 400 is typically motionless between 9:00 PM and 7:00 AM. Based on a combination of these circumstances, charge event detection component 405 may detect the occurrence of a charge event.

In some implementations, some or all of the information, used by charge event detection component 405, may be received from an external device, such as a wearable device. For instance, charge event detection component 405 may receive motion sensor information from a wearable device (such as a smart watch, smart glasses, smart jewelry, etc.), and may use the motion sensor information, from the wearable device, when determining that a charge event has occurred. For instance, if a smart watch provides motion sensor information, indicating that the smart watch has not moved for fifteen minutes (or some other duration of time), this may potentially indicate that the user is asleep. As another example, charge event detection component 405 may receive location information from the wearable device.

The information, received from the wearable device, may be used in lieu of, or in conjunction with, other information (e.g., information detected by internal components of user device 400), in order to detect charge events. In some implementations, charge event detection component 405 may receive such information from a central server, that acts as a communication hub for one or more external devices (e.g., wearable devices). For instance, the central server may be accessible via the Internet, and the wearable device(s) and user device 400 may communicate with the central server via the Internet. In such an implementation, user device 400 may not need to have a direct communication pathway (e.g., Bluetooth, Wi-Fi direct, etc.) to the wearable device(s).

While discussed in the context of being incorporated in user device 400, in some implementations, some or all of the functionality of charge event detection component 405 may be performed by another device, such as a wearable device that is external to, and does not necessarily communicate with, user device 400. In some such implementations, the wearable device may be communicatively coupled to smart circuit breaker 300 (e.g., via a Bluetooth, BLE, Wi-Fi direct, and/or another type of communication technique). In some implementations, the wearable device may be communicatively coupled to smart circuit breaker 300 in an indirect manner (e.g., smart circuit breaker 300 and the wearable device may both communicate, via the Internet and/or another network, with a central server that relays messages between smart circuit breaker 300 and the wearable device).

In some implementations, charge event detection component 405 may determine whether an amount of current drawn, by user device 400, from a charger, should be increased or decreased (in implementations where user device 400 is equipped with circuitry and/or logic that is capable of modulating the amount of current drawn by user device 400). For example, charge event detection component 405 may determine that the current drawn by charge event detection component 405 may be relatively low at night (e.g., when an alarm clock is not set relatively soon, as compared to the current time), even when the charge level is relatively low. That is, while user device 400 may typically increase the current draw when the charge level is low, according to conventional techniques, charge event detection component 405 may allow the current draw to remain relatively low, depending on how likely it is that a full charge is needed at a given time.

On the other hand, charge event detection component 405 may determine that the current, drawn by user device 400, should be increased in certain situations where, according to conventional techniques, the current draw would typically be relatively low. For example, if an alarm clock is set relatively soon and the battery charge level is relatively high (but not full), charge event detection component 405 may determine that the current draw should be increased, in order to ensure that the battery level is full when the alarm clock is set to go off.

Communication component 410 may include hardware circuitry and/or software logic, via which smart circuit breaker 300 may wirelessly communicate with a smart circuit breaker (e.g., smart circuit breaker 300). For example, communication component 410 may be a BLE component, an NFC component, a Wi-Fi component, and/or some other wireless communication component.

Figure 5:
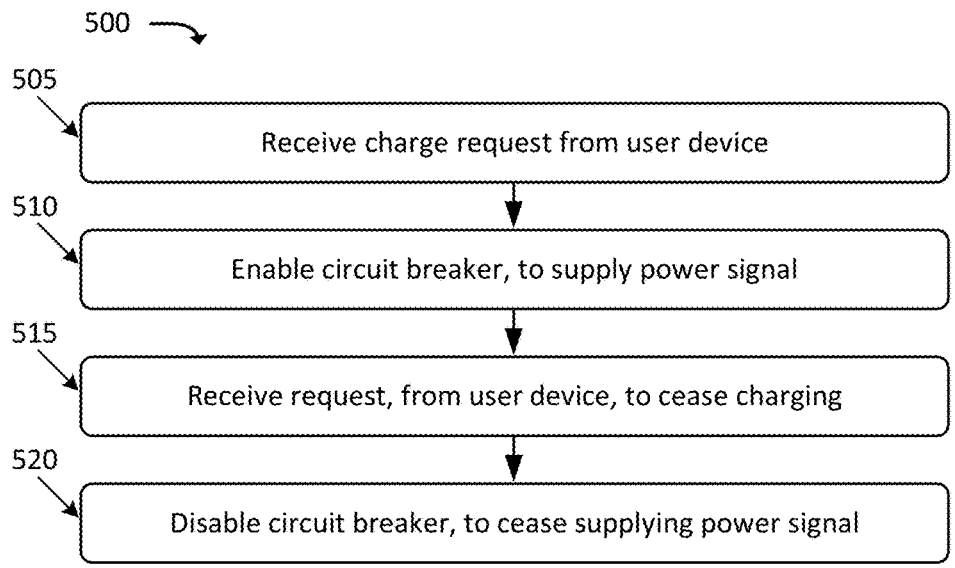
FIGS. 5-7 illustrate flowcharts of example processes for enabling or disabling the supplying of a power signal, based on requests from a user device.

FIG. 5 illustrates an example process 500, for supplying a power signal to a charger based on requests from a user device. In some implementations, process 500 may be performed by smart circuit breaker 300.

As shown, process 500 may include receiving (at 505) a charge request from a user device. For example, as discussed above with respect to communication component 310 and circuit breaker component 315, smart circuit breaker 300 may receive a request, from user device 400, to allow a power signal to pass through smart circuit breaker 300 (e.g., circuit breaker component 315), to a charger that is coupled to smart circuit breaker 300 and user device 400.

Process 500 may also include enabling (at 510) a circuit breaker, to supply a power signal. For example, as discussed above with respect to circuit breaker component 315, smart circuit breaker 300 may allow a power signal, received from an AC source, to pass through smart circuit breaker 300 (e.g., to the charger).

Process 500 may further include receiving (at 515) a request, from the user device, to cease charging. For example, as discussed above with respect to communication component 310 and circuit breaker component 315, smart circuit breaker 300 may receive a request, from user device 400, to stop allowing the power signal to pass through smart circuit breaker 300 (e.g., circuit breaker component 315), to the charger that is coupled to smart circuit breaker 300 and user device 400.

Process 500 may additionally include disabling (at 515) the circuit breaker, to cease supplying the power signal. For example, as discussed above with respect to circuit breaker component 315, smart circuit breaker 300 may stop allowing the power signal, received from the AC source, to pass through smart circuit breaker 300 (e.g., to the charger).

Figure 6:
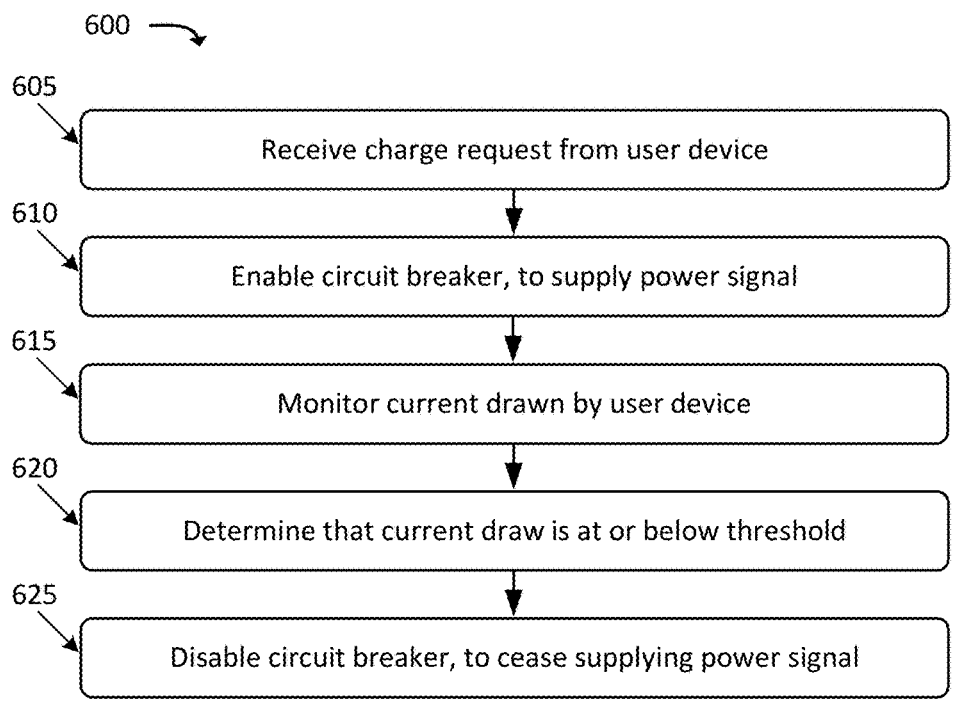

FIG. 6 illustrates an example process 600, for supplying a power signal to a charger based on requests from a user device and/or by monitoring current drawn by the user device. In some implementations, process 600 may be performed by smart circuit breaker 300.

As shown, process 600 may include receiving (at 605) a charge request from a user device. For example, as discussed above with respect to communication component 310 and circuit breaker component 315, smart circuit breaker 300 may receive a request, from user device 400, to allow a power signal to pass through smart circuit breaker 300 (e.g., circuit breaker component 315), to a charger that is coupled to smart circuit breaker 300 and user device 400.

Process 600 may also include enabling (at 610) a circuit breaker, to supply a power signal. For example, as discussed above with respect to circuit breaker component 315, smart circuit breaker 300 may allow a power signal, received from an AC source, to pass through smart circuit breaker 300 (e.g., to the charger).

Process 600 may further include monitoring (at 615) an amount of current drawn by the user device. For example, one or more components of smart circuit breaker 300 may monitor how much current, relating to the supplied power signal, is drawn. In some implementations, this determination may be made when user device 400 has finished charging, and/or when user device 400 has been disconnected from the charger.

Process 600 may additionally include determining (at 620) that the current draw is at or below a threshold. For example, the threshold may be zero, or a near-zero value.

Process 600 may also include disabling (at 625) the circuit breaker, to cease supplying the power signal. For example, as discussed above with respect to circuit breaker component 315, smart circuit breaker 300 may stop allowing the power signal, received from the AC source, to pass through smart circuit breaker 300 (e.g., to the charger), based on determining that the current draw is at or below the threshold.

Figure 7:
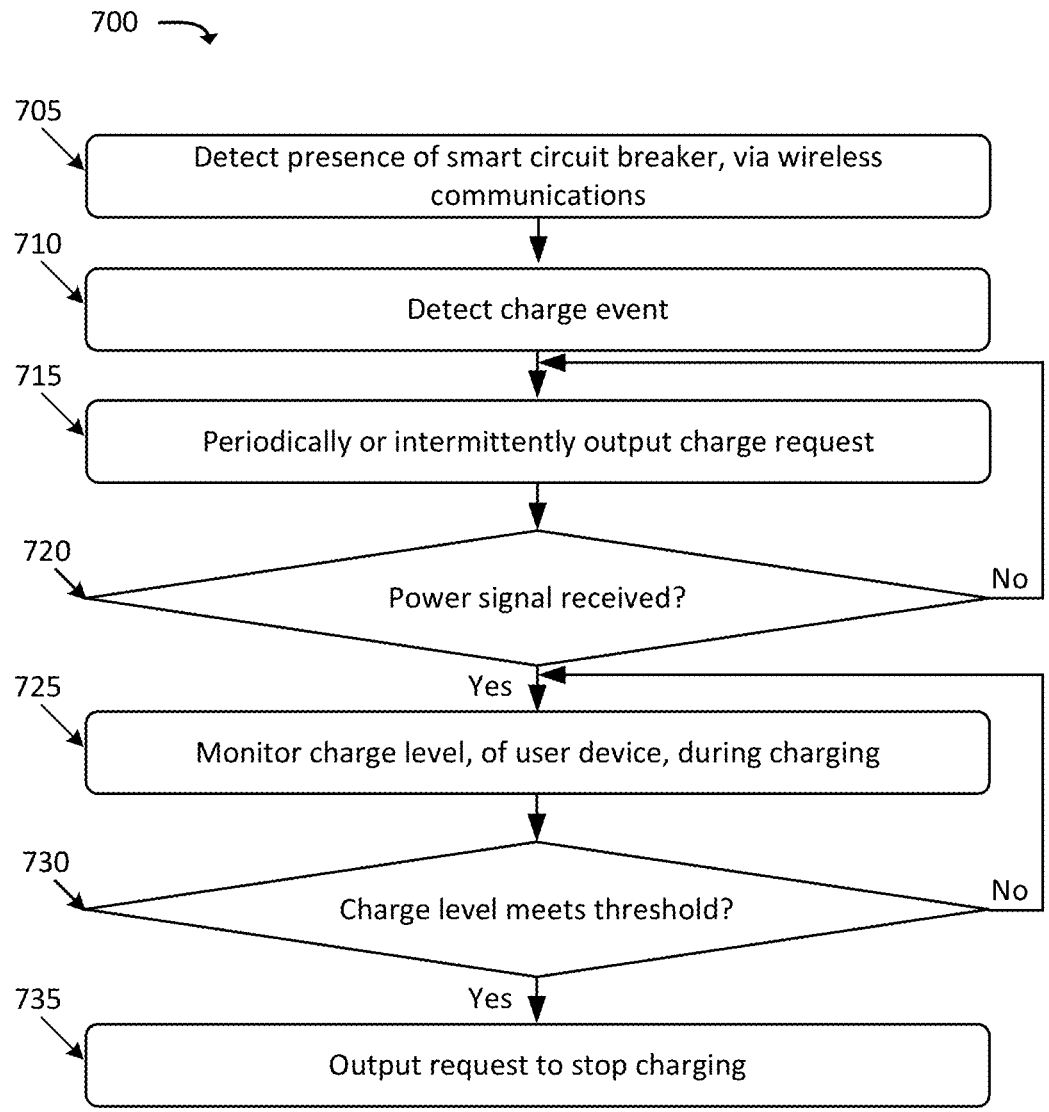

FIG. 7 illustrates an example process 700 for requesting, by a user device, a charge from a smart circuit breaker. In some implementations, process 700 may be performed by user device 400. Generally, process 700 may relate to the discovery of a smart circuit breaker (e.g., smart circuit breaker 300), and the requesting of a power signal from a charger that is coupled to the smart circuit breaker.

As shown, process 700 may include detecting (at 705) the presence of a smart circuit breaker, via wireless communications. For example, as described above with respect to communication component 410, user device 400 may detect the presence of smart circuit breaker 300, when smart circuit breaker 300 and user device 400 are within wireless communication range of each other. For instance, smart circuit breaker 300 may periodically, or intermittently, broadcast a wireless beacon, which may be detected by user device 400. The wireless beacon may be, for example, a device name, a Service Set Identifier ("SSID"), and/or some other type of wireless beacon.

In some implementations, smart circuit breaker 300 may output the beacon less frequently at times that the user typically does not charge user device 400. This information may be based on, for example, observed behavioral information, such as by tracking times that user device 400 typically requests charging. For example, in order to save battery power, smart circuit breaker may forgo outputting a beacon, or may output a beacon less frequently (e.g., twice a minute), and/or for shorter windows, during the day time on weekdays (e.g., when the user is at work), and may output the beacon more frequently (e.g., ten times a minute), and/or for longer windows, during the night time. In some implementations, smart circuit breaker 300 may cease outputting the beacon when user device 400 is charging (e.g., when smart circuit breaker 300 senses a current draw, and/or in between a time that circuit breaker 300 receives a request for charging and a request to cease charging).

Process 700 may also include detecting (at 710) a charge event. For example, as described above with respect to charge event detection component 405, user device 400 may detect that user device 400 should be charged. For instance, user device 400 may detect that a charge level of a battery associated with user device 400 is below a threshold level, that an alarm associated with user device 400 is set to go off soon, and/or some other type of charge event.

Process 700 may further include periodically or intermittently outputting (at 715) a charge request. For example, based on detecting the charge event and the presence of smart circuit breaker 300, user device 400 may output (via, for example, communication component 410) a request to smart circuit breaker 300 to allow a power signal to pass through (e.g., to a charger coupled to smart circuit breaker 300). For instance, user device 400 may output the charge request via an established connection between smart circuit breaker 300 and user device 400. In some implementations, smart circuit breaker 300 and user device 400 may not establish a connection, and the charge request may be broadcasted from user device 400.

Process 700 may additionally include determining (at 720) whether a power signal has been received. For example, in some situations, a power signal may not be received, when user device 400 is not coupled to the charger. If the power signal has not been received (at 720—NO), then process 700 may transition to block 715 (e.g., user device 400 may continue to periodically, or intermittently, output a charge request). It may be apparent, referring back to the example process 600, shown in FIG. 6, that in situations where a charge is requested by user device 400, but not received (e.g., when user device 400 is not coupled to the charger), smart circuit breaker 300 may only supply a power signal to the charger for a very short time, or not at all (e.g., based on monitoring (at 615) the current drawn by the user device).

Referring back to FIG. 7, if the power signal has been received (at 720—YES), the process 700 may include monitoring (at 725) a charge level, of the user device, while charging. For example, user device 400 may monitor a charge level of the battery associated with user device 400.

Process 700 may further include determining (at 730) whether the charge level meets a threshold charge level. For example, as described above with respect to charge event detection component 405, the charge level may vary based on certain conditions (e.g., a present time of day, whether a charge event has been detected, etc.). For instance, during the night time when a user, of user device 400, is typically asleep, the threshold charge level may be relatively low (e.g., 70%), whereas close to a time when the user is expected to wake up, the threshold charge level may be relatively high (e.g., 100%, and/or there may be no reachable threshold charge level, such that the charge is not ceased).

If the charge level does not meet the threshold charge level (at 730—NO), then process 700 may transition back to block 725 (e.g., user device 400 may continue to monitor the charge level). If, on the other hand, the charge level meets (or exceeds) the threshold charge level (at 730—YES), then process 700 may include outputting (at 735) a request to stop charging.

Figure 8:
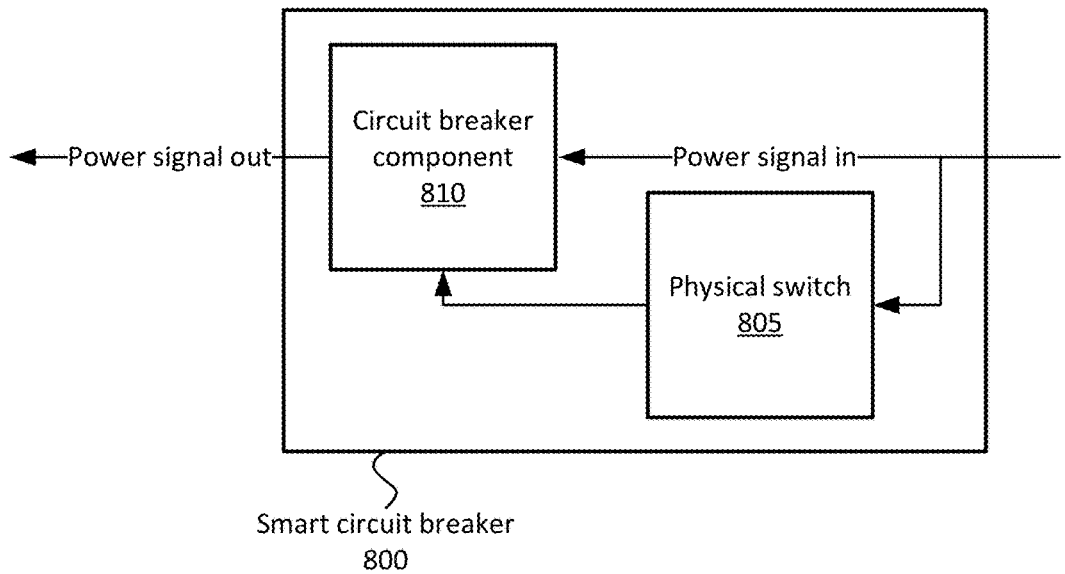
FIG. 8 illustrates another example of functional components of a smart circuit breaker, in accordance with some implementations described herein.

FIG. 8 illustrates example components of smart circuit breaker 800, in accordance with some implementations. In some implementations, smart circuit breaker 800 may be mutually exclusive with smart circuit breaker 300. In other implementations, components and/or concepts, associated with smart circuit breaker 800, may be used in combination with components and/or concepts, associated with smart circuit breaker 300. Generally speaking, smart circuit breaker 300 makes use of a battery and wireless communication circuitry, while smart circuit breaker 800 makes use of a physical switch (e.g., a charge initiation button, as referred to above).

As shown, smart circuit breaker 800 may include physical switch 805 and circuit breaker component 810. In some implementations, smart circuit breaker 800 may include additional, fewer, different, or differently arranged components. Circuit breaker component 810 may be implemented completely, or in part, by hardware circuitry, software logic, and/or a combination thereof.

Physical switch 805 may include a physical component that may be depressed by a user. Physical switch 805 may be spring-loaded, and/or otherwise suitably constructed or designed, such that physical switch 805 returns to its original resting position once the user releases physical switch 805. Physical switch 805 may be coupled to a power source (e.g., an AC outlet), and one or more other components of smart circuit breaker 800 (e.g., to circuit breaker component 810). Physical switch 805 may generally operate to provide an initial surge of power to circuit breaker component 810. Upon depression of physical switch 805, a circuit between the power source and circuit breaker component 810 may be completed. Once physical switch 805 is released, the circuit between the power source and circuit breaker component 810 may be opened, and circuit breaker component 810 may no longer receive power, from the power source, via physical switch 805. However, as described below, circuit breaker component 810 may continue to receive power from the power source.

In some implementations, physical switch 805 may be physically located anywhere on smart circuit breaker 800, including as part of an extended cable that is physically proximate to where a user may typically plug in user device 400 to a charging cable. For example, while not explicitly illustrated as such, smart circuit breaker may include an extended cable, upon which physical switch 805 may be affixed. The same cable may also include the physical wiring that carries the "power signal out" from circuit breaker component 810. In such implementations, the depressing of physical switch 805 may be easier for a user.

Circuit breaker component 810 may be coupled to the power source, to physical switch 805, and to a charger (e.g., an external charger that sits between smart circuit breaker 800 and a user device). Circuit breaker component 810 may include circuitry (e.g., an electromagnet or solid state relay, and/or some other circuitry) to prevent current draw, by circuit breaker component 810, when powered off, and may use power from the power source, after initially receiving power via physical switch 805. That is, circuit breaker component 810 may use power, received via physical switch 805, to initiate the drawing of current from the power source.

Circuit breaker component 810 may also, similar to circuit breaker component 315, include logic and/or circuitry to allow or disallow the passage of the power signal from the power source to the coupled charger. Circuit breaker component 810 may sense an amount of current drawn (e.g., by the coupled charger, which may indicate the current drawn by a user device that is coupled to the charger), and may allow or disallow the passing of the power signal based on the sensed amount of current. For example, if the current draw falls below a threshold, circuit breaker component 810 may disable the passage of the power signal. In some implementations, when disabling the passage of the power signal, circuit breaker component 810 may also disable its own current draw (e.g., from the power source). When disabled, circuit breaker component 810 may be "woken up" by a subsequent actuation of physical switch 805, in the manner described above.

Figure 9:
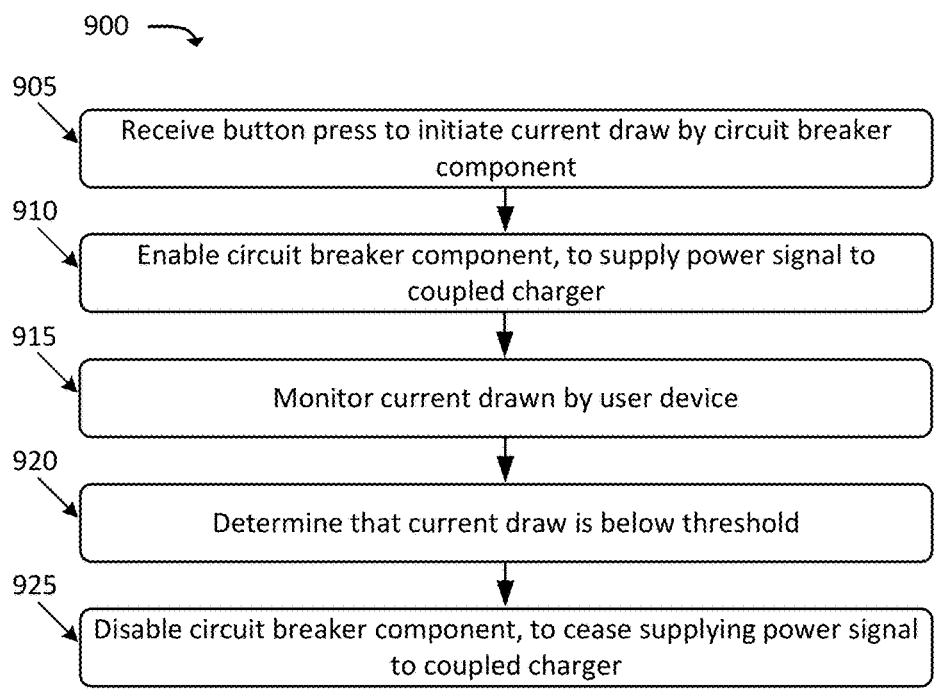
FIGS. 9 and 10 illustrate flowcharts of example processes for supplying power to a user device based on levels of current drawn by the user device, in accordance with some implementations described herein.

FIG. 9 illustrates an example process 900 for enabling or disabling the passage of a power signal by a smart circuit breaker. In some implementations, process 900 may be performed by smart circuit breaker 800.

As shown, process 900 may include receiving (at 905) a button press, to initiate a current draw by a circuit breaker component of smart circuit breaker 800. For example, as described above, a user may actuate (e.g., depress) physical switch 805. This button press may allow current to pass through physical switch 805, to other components of smart circuit breaker 800 (e.g., circuit breaker component 810), thus powering on the other components of circuit breaker component 810.

Process 900 may also include enabling (at 910) at the circuit breaker component, to supply a power signal to a coupled charger. For example, as described above with respect to circuit breaker component 810, smart circuit breaker 800 may supply power to a charger, coupled to smart circuit breaker 800, once circuit breaker component 810 receives power. Supplying the power signal to the charger may allow the charger to provide usable power to a coupled user device, thus charging the user device.

Process 900 may additionally include monitoring (at 915) the current drawn by the user device. For example, as described above with respect to circuit breaker component 810, smart circuit breaker 800 may monitor the current drawn by the coupled charger, which may indicate how much current is being drawn by the user device.

Process 900 may further include determining (at 920) that the current draw is below a threshold. For example, as described above with respect to circuit breaker component 810, if the current drawn is below a threshold, this may indicate that the user device has been unplugged or is fully charged. Process 900 may also include disabling (at 925) the circuit breaker component, to cease supplying the power signal to the coupled charger, based on determining that the current draw is below the threshold.

Figure 10:
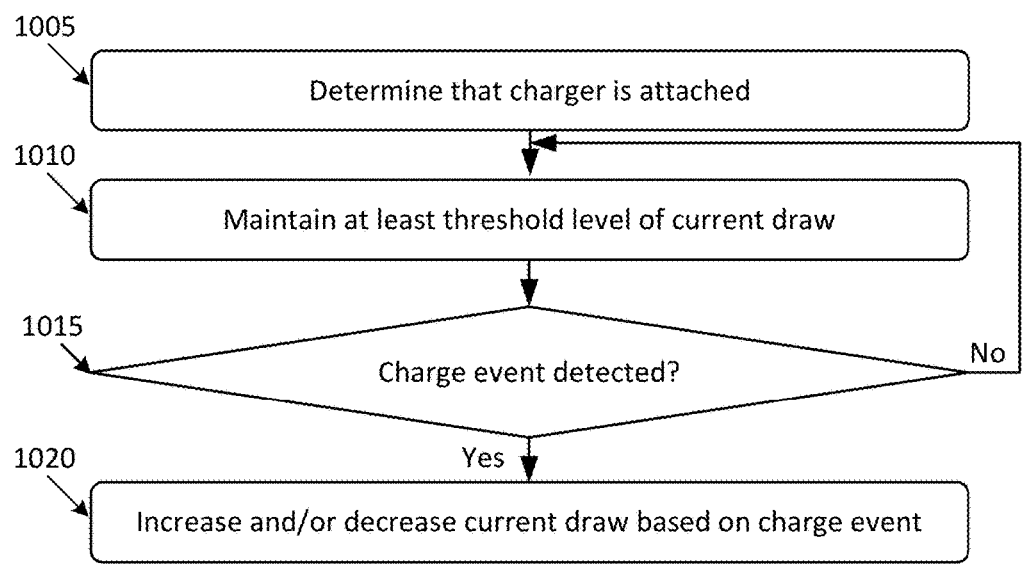

FIG. 10 illustrates an example process 1000 for increasing and/or decreasing current draw, based on the detection of a charge event. In some implementations, process 1000 may be performed by a user device (e.g., user device 400).

As shown, process 1000 may include determining (at 1005) that a charger is attached. For example, user device 400 may use any technique, including a conventional technique, to determine that a power signal is being provided to user device 400 (e.g., a charging cable has been coupled to user device 400).

Process 1000 may also include maintaining (at 1010) at least a threshold level of current draw. The threshold current draw may be set, for example, with knowledge of the threshold current draw referred to in FIG. 9 (e.g., a threshold current below which smart circuit breaker 800 shuts off). That is, the threshold current may be designed such that smart circuit breaker 800 does not shut off while at least the threshold level of current draw is being maintained by user device 400.

Process 1000 may further include determining (at 1015) whether a charge event has been detected. As mentioned above, a charge event may relate to a present time of day, a present level of charge associated with a battery of user device 400, a time of a set alarm clock associated with user device 400, etc. If a charge event is not detected (at 1015—NO), then process 1000 may transition back to block 1010 (e.g., smart circuit breaker 300 may continue maintaining at least the threshold level of current draw).

If, on the other hand, a charge event is detected (at 1015—YES), then process 1000 may include increasing (at 1020) the current draw. For example, smart circuit breaker 300 may increase the current draw when an alarm is set to go off soon, in order to ensure that user device 400 is fully charged when the alarm is set to go off. In some implementations, user device 400 may decrease the current draw in response to certain charge events.

FIGS. 11A-11F conceptually illustrate example the operation of one or more implementations, described herein. These figures show example user interfaces, that may be displayed on user device 400, when certain operations are performed.

Figure 11A:
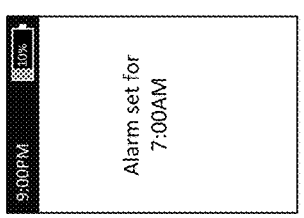
FIGS. 11A-11F conceptually illustrate an example implementation, in which a user device may request charging based on detecting a charging event.

As shown in FIG. 11A, user device 400 may be plugged in to a charger at 9:00 PM. At this time, the charge level of a battery, associated with user device 400, may be 10%. Additionally, assume that user device 400 requests charging (e.g., to smart circuit breaker 300) at this time. As further shown, user device 400 may be associated with an alarm clock that is set for 7:00 AM.

Figure 11B:
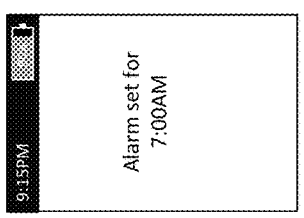

As shown in FIG. 11B, user device 400 may be 90% charged at 9:15 PM. User device 400 may determine that charging does not need to continue. For example, based on observed user behavior patterns, it may be likely that the user is asleep or in bed, and will likely not need user device 400 to be fully charged until the morning. Based on this determination, user device 400 may request that charging be stopped (e.g., by wirelessly communicating with smart circuit breaker 300). As mentioned above, the user behavior patterns may be based on information from a motion-sensing component of user device 400, information from a location determination component of user device 400, and/or information from an external source (that provides user behavior information).

Figure 11C:
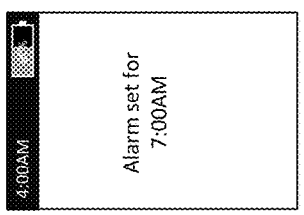
Figure 11D:
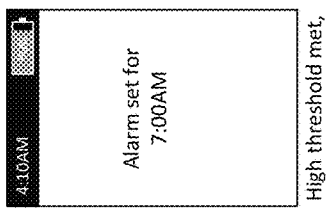

As shown in FIG. 11C, user device 400 may be 60% charged at 4:00 AM. User device 400 may determine that the charge level is at or below a low threshold, and may request charging based on the low charge level. In FIG. 11D, user device 400 may once again reach the high threshold (90% charged) at 4:15 AM, and may request that charging be stopped.

Figure 11E:
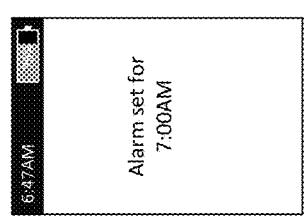
Figure 11F:
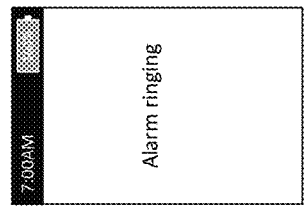

As shown in FIG. 11E, user device 400 may detect a charge event at 6:47 AM (e.g., that the 7:00 AM alarm is set to go off soon, and that the battery is not fully charged). Based on detecting the charge event, user device 400 may request (e.g., by communicating wirelessly with smart circuit breaker 300) that charging commence. As shown in FIG. 11F, at 7:00 AM, the alarm may go off, and the charge level of user device 400 may be 100%.

In some implementations, one or more of the above techniques may be manually overridden. For example, in situations where a user desires to disable the "smart" features of charging user device 400 (e.g., and charge the device according to conventional charging techniques), user device 400 may provide a user interface option (e.g., a selectable button, menu item, etc.) that allows the user to disable the smart charging. For instance, when the option to disable the smart charging is selected, one or more of the techniques mentioned above may not be used. For example, user device 400 may forgo requesting (e.g., at 735) that smart circuit breaker 300 cease allowing current to be passed to user device 400, even if the battery of user device 400 is full or above a threshold. In some implementations, smart circuit breaker 800 may have a physical component that holds physical switch 805 down, such that circuit breaker 810 continues to receive power, and continues to pass current.

Figure 12:
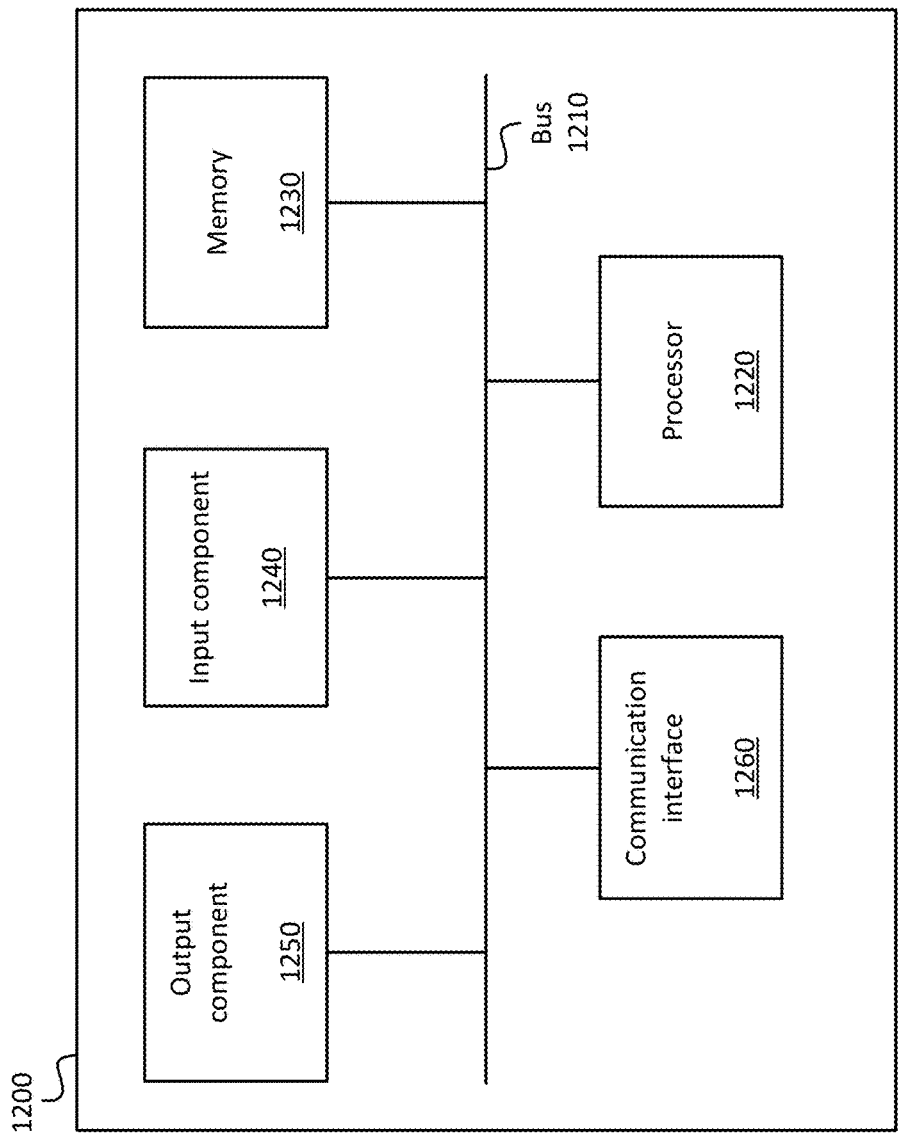
FIG. 12 illustrates example components of a device, in accordance with some implementations described herein.

FIG. 12 is a diagram of example components of device 1200. One or more of the devices described above may include one or more devices 1200. Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, or processing logic that may interpret and execute instructions. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200, such as a keyboard, a keypad, a button, a switch, etc. Output component 1250 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described with regard to FIGS. 5-7, 9, and 10, the order of the blocks and/or signals may be modified in other implementations. Further, non-dependent blocks and/or signals may be performed in parallel. Additionally, while FIGS. 5-7, 9, and 10 have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
    a wireless communication component, configured to:
        receive one or more requests from a user device, the one or more requests including at least one of:
            a first request to allow a current to be passed to the user device, or
            a second request to disallow current from being passed to the user device;
    a direct current ("DC") power source, wherein the wireless communication component is powered by the DC power source and is not powered by an alternating current ("AC") power source; and
    a circuit breaker component, configured to:
        receive a power signal from the AC power source,
        receive the one or more requests, from the user device and via the wireless communication component, and
        selectively pass current, associated with the power signal, to the user device, based on the one or more requests received from the user device, wherein when selectively passing current, the circuit breaker component is configured to:
            allow the current, associated with the power signal, to be passed to the user device, when receiving the first request, and
            disallow the current, associated with the power signal, to be passed to the user device, when receiving the second request,
    wherein the user device is configured to:
        store information regarding an alarm function of the user device, the information indicating a time for which the alarm function is set;
        output, to the wireless communication component, the first request when a charge level of the user device is below a first threshold charge level and when a current time is within a threshold amount of time before the time for which the alarm function is set; and output, to the wireless communication component, the second request when the charge level of the user device is above a second threshold charge level and when the current time is greater than the threshold amount of time before the time for which the alarm function is set.

2. The device of claim 1, wherein the wireless communication component includes at least one of:
  a Bluetooth Low Energy ("BLE") component, or
  an Institute of Electrical and Electronics Engineers Institute of Electrical and Electronics Engineers ("IEEE") 802.11-based component.

3. The device of claim 1, wherein the circuit breaker component includes one or more relays that facilitate the allowing and the disallowing of the current to be passed to the user device.

4. The device of claim 1, wherein the wireless communication component is further configured to:
  periodically or intermittently output a beacon signal that allows the user device to discover a presence of the device.

5. The device of claim 4, wherein how frequently the beacon signal is outputted is varied based on behavior information, associated with the user device or a user of the user device.

6. The device of claim 1, wherein the circuit breaker component is further configured to:
  sense an amount of current drawn by the user device, when passing the power signal to the user device; and
  cease passing the power signal to the user device when the amount of current drawn meets or falls below a threshold.

7. The device of claim 1, wherein an external charging device is in line between the device and the user device, wherein the external charging device consumes zero power when the circuit breaker component does not pass the power signal to the user device.

8. A method, comprising:
  storing, by a user device, information regarding an alarm function of the user device, the information indicating a time for which the alarm function is set;
  outputting, by the user device and to a charging device, a first request, to charge the user device, when a charge level of the user device is below a first threshold charge level and when a current time is within a threshold amount of time before the time for which the alarm function is set;
  outputting, by the user device and to the charging device, a second request, to disable charging of the user device, when the charge level of the user device is above a second threshold charge level and when the current time is greater than the threshold amount of time before the time for which the alarm function is set;
  receiving, via a wireless communication component of the charging device, one or more requests from a user device, the one or more requests including at least one of:
    the first request, or
    the second request,
    wherein the wireless communication component is powered by a direct current ("DC") power source and is not powered by an alternating current ("AC") power source;

receiving, via a circuit breaker component of the charging device, a power signal from the AC power source; and selectively passing, by the circuit breaker component, current, associated with the power signal, to the user device, based on the one or more requests received from the user device, wherein the selectively passing current includes:
  allowing the current, associated with the power signal, to be passed to the user device, when receiving the first request, and
  disallowing the current, associated with the power signal, to be passed to the user device, when receiving the second request.

9. The method of claim 8, wherein the wireless communication component includes at least one of:
  a Bluetooth Low Energy ("BLE") component, or
  an Institute of Electrical and Electronics Engineers Institute of Electrical and Electronics Engineers ("IEEE") 802.11-based component.

10. The method of claim 8, wherein the allowing and the disallowing, of the current to be passed to the user device, includes activating and deactivating an electromagnet associated with the circuit breaker component.

11. The method of claim 8, further comprising:
  periodically or intermittently outputting a beacon signal that allows the user device to discover a presence of the charging device.

12. The method of claim 11, wherein how frequently the beacon signal is outputted is varied based on behavior information, associated with the user device or a user of the user device.

13. The method of claim 8, further comprising:
  sensing an amount of current drawn by the user device, when passing the power signal to the user device; and
  ceasing passing the power signal to the user device when the amount of current drawn meets or falls below a threshold.

14. The method of claim 8, wherein the user device consumes zero AC power when the circuit breaker component does not pass the power signal to the user device.

15. A system, comprising:
  a user device, comprising:
    a non-transitory computer-readable medium storing:
      a set of processor-executable instructions, and
      information regarding an alarm function of the user device, the information indicating a time for which the alarm function is set; and
    one or more processors configured to execute the processor-executable instructions to:
      output, to a charging device, a first request, to charge the user device, when a charge level of the user device is below a first threshold charge level and when a current time is within a threshold amount of time before the time for which the alarm function is set;
      output, to the charging device, a second request, to disable charging of the user device, when the charge level of the user device is above a second threshold charge level and when the current time is greater than the threshold amount of time before the time for which the alarm function is set; and
  the charging device, wherein the charging device is configured to:
    receive, by a first component that is powered by a direct current ("DC") power source and is not powered by an alternating current ("AC") power source, one or more requests from the user device, the one or more requests including at least one of:
the first request, or
the second request;
receive, by a second component, a power signal from the AC power source; and
selectively pass current, associated with the power signal, to the user device, based on the one or more requests received from the user device, wherein the selectively passing current includes:
allowing the current, associated with the power signal, to be passed to the user device, when receiving the first request, and
disallowing the current, associated with the power signal, to be passed to the user device, when receiving the second request.

16. The system of claim 15, wherein the one or more requests are received via at least one of:
a Bluetooth Low Energy ("BLE") technique, or
an Institute of Electrical and Electronics Engineers Institute of Electrical and Electronics Engineers ("IEEE") 802.11-based technique.

17. The system of claim 15, wherein the allowing and the disallowing, of the current to be passed to the user device, includes activating and deactivating an electromagnet associated with the charging device.

18. The system of claim 15, wherein the DC power source includes a battery.

19. The device of claim 1, wherein the DC power source includes a battery.

20. The method of claim 8, wherein the DC power source includes a battery.

* * * * *